Feb. 3, 1948.   S. H. HAY   2,435,351
COMBINATION FISH SCALER AND SCRAPER
Filed March 6, 1946
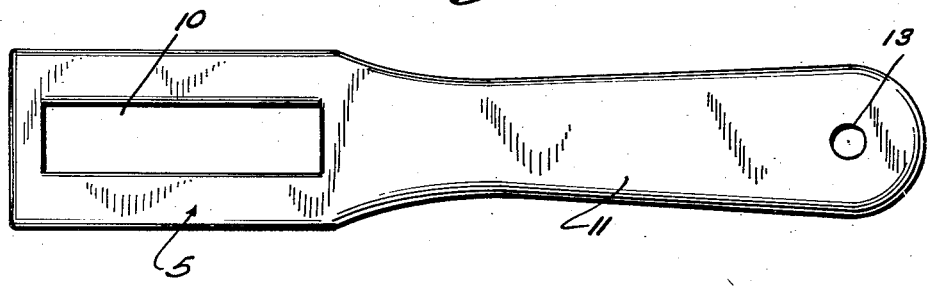
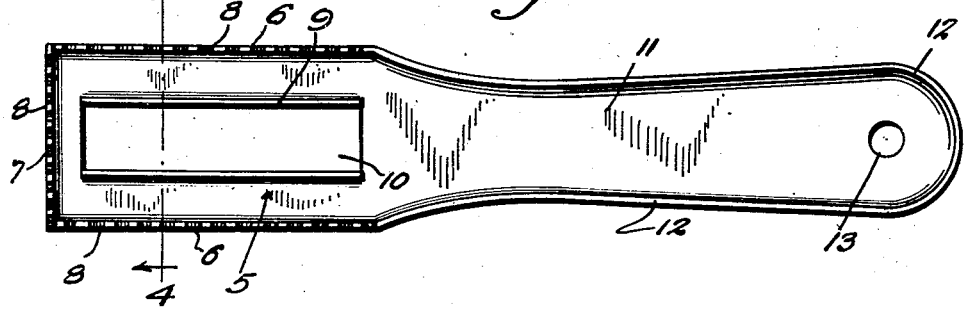
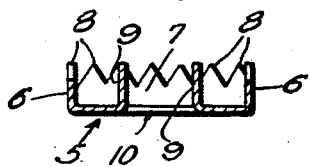
Inventor
STEVEN H. HAY Patented Feb. 3, 1948

2,435,351

UNITED STATES PATENT OFFICE 2,435,351

COMBINATION FISH SCALER AND SCRAPER

Steven H. Hay, Racine, Wis.

Application March 6, 1946, Serial No. 652,420

1 Claim. (Cl. 17—7)

This invention relates to new and useful improvements and structural refinements in fish scalers and scrapers, more specifically, to a combination fish scaler and scraper, and the principal object of the invention is to provide a device of the character herein described, whereby both the scaling and scraping operation may be conveniently and efficiently performed by using only one implement.

A further object of the invention is to provide a combination scaler and scraper which may be effectively and suitably employed for the intended purpose, without the danger of tearing, cutting, or otherwise damaging the skin of the fish, such as is frequently experienced when using scrapers or scalers of conventional design.

Another object of the invention is to provide a combination scaler and scraper which is simple in construction and operation and which cannot easily become damaged.

An additional object of the invention is to provide a combination scaler and scraper which is formed integrally from one piece of material and which will readily lend itself to economical manufacture.

With the above more important objects in view, and such other objects as may become apparent as this specification proceeds, the invention consists essentially of the arrangement and construction of parts as illustrated in the accompanying drawings, in which:

Figure 1 is a top plan view of the invention;

Figure 2 is a side elevation of the same;

Figure 3 is an underside plan view thereof, and

Figure 4 is a cross sectional view, taken in the plane of the line 4—4 in Figure 3.

Like characters of reference are used to designate like parts in the specification and throughout the several views.

Referring now to the accompanying drawings in detail, the invention consists of a substantially rectangular plate designated generally by the reference character 5, the same being formed with flanged marginal edges 6 and 7 at the longitudinal sides and one end thereof respectively.

The edges 6 and 7 are cut substantially as shown to provide scale removing teeth 8 and a pair of scraper flanges or blades 9 are struck out from the mid-portion of the plate 5, as will be clearly apparent from the accompanying drawings.

It will be noted that after the blades are struck out and flanged, an opening 10 will be formed in the plate. The blades are disposed on the same side of the plate 5 as the edges 6 and 7 and extend between and parallel with the longitudinal edges 6.

A suitable handle 11, formed with the flanged marginal portion 12 is provided integrally with the remaining end of the plate 5, the handle being angulated somewhat, upwardly from the plate, to facilitate convenient manipulation while in use.

When the invention is placed in use, the teeth 8 will effectively loosen and remove the scales and the scraper blades 9 will simultaneously clean the slime and the like, such as is usually found on the skin of the fish. It should be noted that since the scraping edges of the blades 9 are substantially co-planar with the extremities of the teeth 8, the blades will act as guides to prevent the teeth from penetrating too deeply into the skin, and the conventionally experienced tearing or breaking of such skin will thus be eliminated.

The outer end of the handle 11 may be formed with a suitable nail aperture 13, whereby the device may be conveniently suspended when not in use.

While in the foregoing there has been shown and described the preferred embodiment of this invention it is to be understood that minor changes in the details of construction, combination and arrangement of parts may be resorted to without departing from the spirit and scope of the invention as claimed.

What I claim as my invention is:

A fish scaler and scraper comprising, a substantially rectangular plate formed with flanged marginal edges at longitudinal sides and one end thereof, said edges extending from one side of said plate and being cut to provide scale removing teeth, a plurality of flanges struck out from the mid portion of said plate, said flanges being disposed between and parallel with the longitudinal edges of said plate and defining scraper blades, the scraping edges of said blades being substantially coplanar with the extremities of said teeth, and a handle formed integrally with the remaining end of said plate.

STEVEN H. HAY.

REFERENCES CITED

The following references are of record in the file of this patent:

UNITED STATES PATENTS

| Number | Name | Date |
|---|---|---|
| 916,725 | Lafrentz | Mar. 30, 1909 |
| 1,920,954 | Benedict | Aug. 8, 1933 |
| 1,997,339 | Olson | Apr. 9, 1935 |
| 2,333,878 | Nelson | Nov. 9, 1943 |
| 2,275,713 | Ahlborg | Mar. 10, 1942 |